(12) United States Patent
Gilson

(10) Patent No.: US 9,542,953 B2
(45) Date of Patent: Jan. 10, 2017

(54) INTELLIGENT DATA DELIVERY

(71) Applicant: COMCAST CABLE COMMUNICATIONS, LLC, Philadelphia, PA (US)

(72) Inventor: Ross Gilson, Philadelphia, PA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 73 days.

(21) Appl. No.: 14/161,198

(22) Filed: Jan. 22, 2014

(65) Prior Publication Data

US 2015/0206542 A1    Jul. 23, 2015

(51) Int. Cl.
| | | |
|---|---|---|
| *G10L 19/022* | (2013.01) | |
| *G10L 19/012* | (2013.01) | |
| *H04N 21/437* | (2011.01) | |
| *H04N 21/845* | (2011.01) | |

(52) U.S. Cl.
CPC .......... *G10L 19/012* (2013.01); *H04N 21/437* (2013.01); *H04N 21/8456* (2013.01)

(58) Field of Classification Search
CPC .. H04L 43/0829; H04L 65/1069; H04L 65/80; H04L 43/16; H04L 45/28; H04L 41/5003; H04L 1/0002; H04L 1/0009; H04L 41/5009; H04L 29/06027; H04L 67/14; H04L 27/2602; H04L 5/006; H04W 24/02; H04W 52/24; H04W 52/36; H04W 52/367; H04W 52/243; H04B 7/0857

USPC .......... 704/226–229, 205–207; 370/230–233
See application file for complete search history.

(56) References Cited

U.S. PATENT DOCUMENTS

| | | | | |
|---|---|---|---|---|
| 6,018,647 A | * | 1/2000 | Fitzgerald | H04B 7/082 455/135 |
| 2006/0269111 A1 | * | 11/2006 | Stoecker | G06F 19/321 382/128 |
| 2007/0268960 A1 | * | 11/2007 | Jia | G01S 19/28 375/147 |
| 2013/0042015 A1 | | 2/2013 | Begen et al. | |

OTHER PUBLICATIONS

Reznik, "Achieving consistent qiality of video delivery with MPEG-DASH", 101. MPEG Meeting, Stockholm, Sweden, Jul. 12, 2012 (5 pages).
Zhang, et al., "In Band Signaling for Quality Driven Adaptation", 103, MPEG Meeting, Geneva, Switzerland, Jan. 17, 2013 (4 pages).
Extended European Search Report issued by the European Patent Office on Jun. 29, 2015 for application EP 15152171.3, filed on Jan. 22, 2015 and published as EP 2899990 on Jul. 29, 2015 (Applicant—Comcast Corp. // Inventor—Gilson) (9 pages).

* cited by examiner

*Primary Examiner* — Marivelisse Santiago Cordero
*Assistant Examiner* — Stephen Brinich
(74) *Attorney, Agent, or Firm* — Ballard Spahr LLP

(57) ABSTRACT

Methods and systems for managing and transmitting content are disclosed. A sample method can comprise determining signal-to-noise ratio information relating to one or more data blocks and determining a threshold signal-to-noise ratio. At least one of the one or more data blocks can be requested based upon respective signal-to-noise ratio information and the threshold signal-to-noise ratio.

20 Claims, 8 Drawing Sheets


INTELLIGENT DATA DELIVERY

BACKGROUND

Data such as content can be provided by multiple sources. Multibitrate (MBR) delivery can be implemented to provide various versions of the same content asset. For example, different versions of a content asset can relate to different quality levels. MBR may be used for live streaming. Usually the client applications select which rate they can support based on available bandwidth. However, such rate selection may not be preferred for all types of data reception. These and other shortcomings are addressed by the present disclosure.

SUMMARY

It is to be understood that both the following summary and the following detailed description are exemplary and explanatory only and are not restrictive. Disclosed are methods and systems for, in one aspect, providing and controlling transmission of data such as content delivered to one or more devices. Provided are methods and systems for, in one aspect, determining data characteristics relating to one or more data assets (e.g., content assets). Such data characteristics can be signal-to-noise ratios for at least a portion of a content asset and/or coding information such as scalable video coding. Other information can be determined such as information relating to a user or a user's circumstances time available for downloading a content asset). In an aspect, one or more versions (e.g., bit rates) of a content asset, or portion o the asset, can be selected for delivery based upon one or more of the determined data characteristics. In another aspect, a user can manually select the preferred bit rate of a content asset. In a further aspect, a user can provide information such as an available time to allow download. The one or more versions (e.g., bit rates) of a content asset can be selected for delivery based upon information provided by the user and/or relating to the user (e.g., location, movement, speed, etc.).

In an aspect, methods can comprise determining signal-to-noise ratio information relating to one or more data blocks. A threshold signal-to-noise ratio can be determined. One or more of the data blocks can be identified, requested, and/or transmitted based upon respective signal-to-noise ratio information and the threshold signal-to-noise ratio.

In an aspect, methods can comprise providing first data having a first characteristic, wherein the first data relates to a content asset and providing second data having a second characteristic, wherein the second data relates to the content asset. A time parameter can be determined, the time parameter relating to the receipt of data. One or more of the first data and the second data can be selected based on the determined time parameter. The selected one or more of the first data and the second data can be transmitted, for example, within the time parameter.

In an aspect, methods can comprise determining peak signal-to-noise ratio information relating to one or more data blocks. Each of the one or more of the data blocks can have an associated bit rate. A threshold peak signal-to-noise ratio can be determined. One or more of the data blocks can be transmitted based upon respective peak signal-to-noise ratio information and the threshold peak signal-to-noise ratio.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
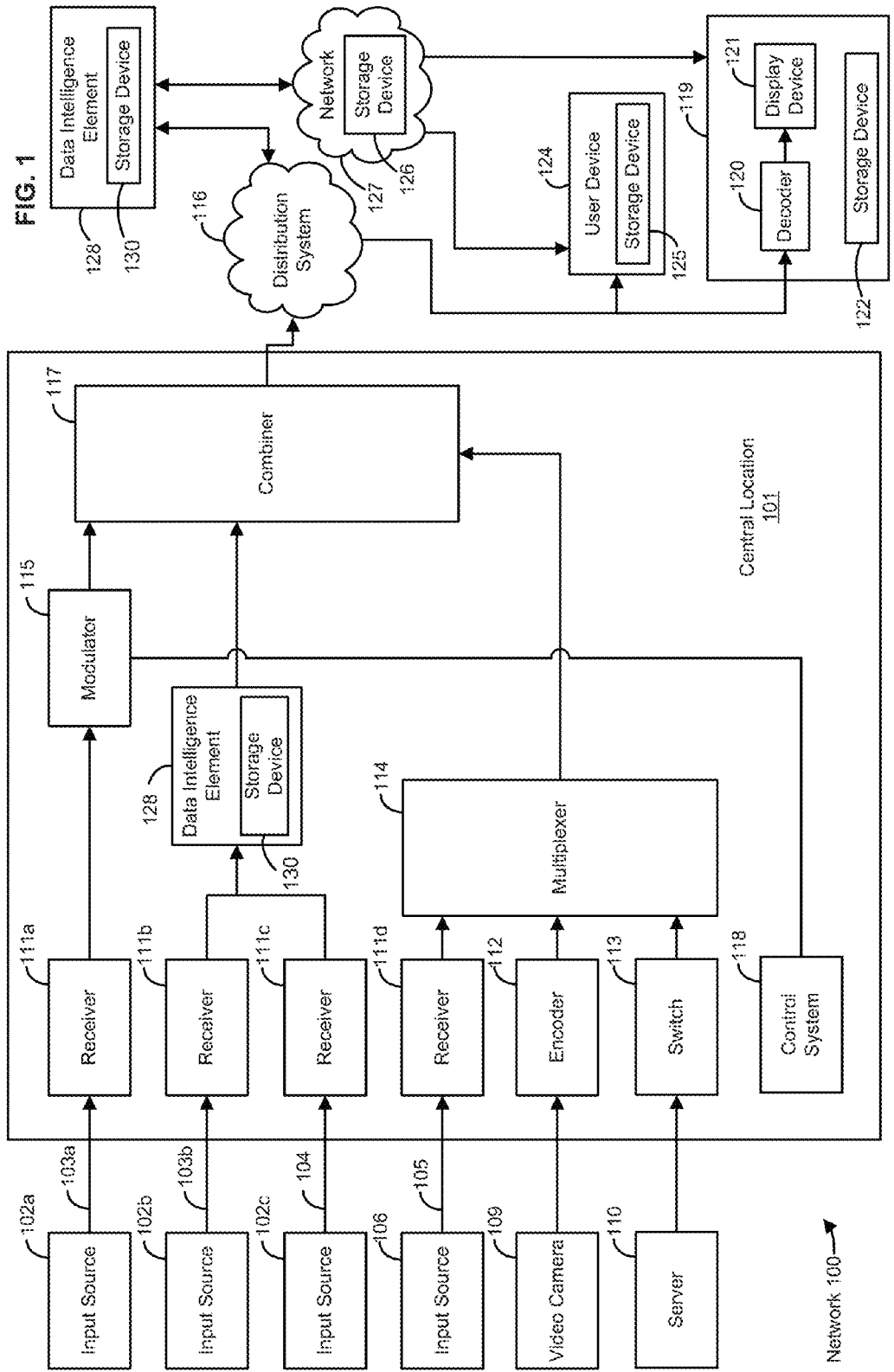
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc, of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, in one aspect, determining data characteristics relating to one or more data assets (e.g., content assets). Such data characteristics can be signal-to-noise ratios for at least a portion of a content asset and/or coding information such as scalable video coding. Other information can be determined such as information relating to a user or a user's circumstances (e.g., time available for downloading a content asset). In an aspect, one or more versions (e.g., bit rates) of a content asset can be selected for delivery based upon one or more of the determined data characteristics. In another aspect, a user can manually select the preferred bit rate of a content asset. In a further aspect, a user can provide information such as an available time to allow download. The one or more versions (e.g., bit rates) of a content asset can be selected for delivery based upon information provided by the user.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The network 100 can comprise a central location 101 (e.g., a headend, or processing facility), which can receive content (e.g., data, input programming) from multiple sources. The central location 101 can combine the content from the various sources and can distribute the content to user subscriber) locations (e.g., location 119) via distribution system 116.

In an aspect, the central location 101 can be a data processing facility configured to receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders, such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the decoder 120 can receive and process the embedded markers, flags, and signals in the content data stream for controlling a content received by the decoder 120.

In an aspect, the decoder 120 or communication terminal can comprise a storage device 122. As an example, the storage device 122 can comprise a memory or other storage medium. As a further example, a number of content assets (e.g., video, audio, etc.) can be loaded into the storage device 122 and stored for playback or processing by the associated decoder 120. However, other data, content, and/or information can be stored in the storage device 122 such as advertisements and alternative content, for example. In an aspect, the storage device 122 can be separate from the decoder 120. For example, the storage device 122 can be located upstream of the decoder 120 and downstream of the distribution system 116. As a further example, the storage device 122 can store information to be transmitted to any number of decoders 120 or other recipient devices. Accordingly, the decoder 120 can retrieve the content assets from the storage device 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as network storage medium 126.

In an aspect, a data intelligence element 128 can be in communication with one or more of the central location 101, the decoder 120, and the user device 124. The data intelligence element 128 can be software, hardware (e.g., processor and/or memory), or a combination thereof. The data intelligence element 128 can be located in one or more existing elements or it can be standalone. In another aspect, the data intelligence element 128 can be configured to receive content such as incoming network programming or a network feed via the central location 101. As an example, while the incoming network programming is received by the data intelligence element 128.

In an aspect, the data intelligence element 128 can be associated with and/or can comprise a storage device 130. As an example, the storage device 130 can comprise a memory or other storage medium. As a further example, a number of content assets (e.g., video, audio, etc.) can be loaded into the storage device 130 and stored for transmission or processing by the data intelligence element 128. However, other data, content, and/or information can be stored in the storage device 130 such as advertisements and alternative content, for example. In an aspect, the storage device 130 can be separate from the data intelligence element 128 and accessible thereby.

In an aspect, the data intelligence element 128 can be configured to determine a signal-to-noise ratio relating to one or more content assets or portions of content. As an example, a peak signal-to-noise ratio (PSNR) can be determined for one or more frames or blocks of encoded frames in one or more videos. The PSNR can be based on the mean squared error. As another example, a device user device 124) configured to receive the content can select a quality setting for the received content, wherein the quality setting defines a minimum PSNR setting to be applied throughout the entire video. Accordingly, for example, portions of the content (e.g., frames, data blocks, scenes) where there is fast motion or other hard to compress video, the receiving device can be received (e.g., downloaded) having a high bitrate to maintain the minimum PSNR associated with the selected quality setting. Other portions of the video, such as easy to compress video, can be received having a lower bitrate, while maintaining the minimum PSNR. As an example, the PSNR can be determined continuously or periodically. As the determined PSNR exceeds (or approaches) a threshold PSNR, higher bitrate versions of one or more data blocks can be selected to maintain the minimum PSNR. In another aspect, when downloading or otherwise transferring (e.g., streaming) data, time can be allotted per block or per scene based on PSNR. As an example, more time can be allotted for high PSNR data blocks and less time can be allotted for low PSNR data blocks.

Content with many scene cuts can comprise more I-frames in the group of pictures (GOP) format. I-frames can contain the bulk of the data of a content asset (e.g., video stream, downloadable content item) compared to the p-frames and b-frames. Accordingly, scenes (e.g., data blocks representing a scene) having multiple I-frames could be downloaded at a higher bitrate to try and maintain a particular playback quality, while having to process larger amounts of data.

In an aspect, the amount of motion in a scene can be determined by an encoder since the encoder is often configured to perform motion estimation in order to properly encode the video. As such, the encoder can track and/or log how much motion was present in each data block (or group of blocks) and the client and/or server can determine a bitrate applied to each block.

In another aspect, a bitrate can be selected based upon other factors such as time available to complete the download. There are various ways to determine how much time a user or device has to download a content asset such as determining a time of day (e.g., user will be sleeping for hours, during a commute, during lunch, etc.), determining a state of the device (e.g., is the device located near a car/airport/train station?, is the device about the be disconnected from a communication network?). Once the amount of time to complete the download is assessed, it can be determined how much bulk data can be downloaded within the assessed time limit. Once the bulk data is known, a selection of bitrate or bitrates for one or more blocks can be determined to ensure the user receives the entire content asset within the time limit.

In a further aspect, a variability of bitrates (e.g., how much can the bitrate vary from block to block) can also be factored into such calculations in order to maintain a particular viewing experience. A selection of variability of bitrate can be based on various parameters such as configurations (e.g., screen size) of the receiving device and user habits and/or preferences. For example, if a user has a habit of jumping from scene to scene or if the user starts watching the content asset before the complete asset is downloaded, the system can start downloading at a first bitrate for a first portion (e.g., 30%) of the content asset and then select a second lower bitrate for the remaining second portion (e.g., 70%) of the content asset. As a further example, the user can begin viewing the first portion and may have time to receive a scalable video coding (SVC) stream to improve quality of certain blocks in the second portion before viewing of the second portion.

In an aspect, the data intelligence element 128 can be configured to determine coding information (e.g., scalable video coding (SVC)) relating to one or more content assets or portions of content. As an example, SVC or similar method can be implemented to facilitate the reception (e.g., download) of coding information having the delta between two different MBR streams. As a further example, a receiving device (e.g., user device 124) can initiate a download of the lowest available bitrate data so that the user can receive or access (e.g., download) the entire content asset as quickly as possible. The receiving device can then receive or access SVC delta information for the received content asset to improve upon the initial version of the content asset. As an example, the SVC delta information relating to portions of the content with the lowest PSNR can be received first. Other coding information can be received and applied to any portion of the content asset to improve the bitrate of the portion.

In an aspect, each block or group of blocks of a particular data asset can be assigned a score such as PSNR, number of I-frames, amount of motion, and/or crowd sourced statistic such as the number of users that watched a block multiple times or the number of users that skipped blocks to reach a particular scene (e.g., block of frames). Since each block or group of blocks has a score, a device (e.g., data intelligence element 128) can determine rank) a level of importance of one block compared to another. For example, the assigned score can be a relative score based on all the blocks in the content asset. As such, if the content asset was downloaded quickly (e.g., at low bitrates) and now the system needs to determine which blocks should be improved first, the score of each block can be used to determine an order of which blocks are processed first to improve quality.

In an aspect, the data intelligence element 128 can be configured to facilitate selection of one or more versions bit rates) of a content asset. In another aspect, a user can manually select the preferred bit rate or quality level of a content asset. In a further aspect, a user can provide information such as an available time to allow download and the data intelligence element 128 and/or user device 124 can determine the best bit rate that will allow the entire content asset to be downloaded.

In an aspect, when a receiving device is downloading a MBR content asset versus streaming the content asset, the receiving device does not need to maintain a specific throughput to view a specific quality (e.g., bit rate) of the content asset. For example, if a receiving device has a network connection that is consistently 500 kbps, and the available MBR streams are 300 kbps, 600 kbps, 1200 kbps and 3000 kbps, the receiving device can only ever stream the lowest 300 kbps stream (with occasional 600 kbps blocks) unless the receiving device buffers for an extended period of time. However, when downloading the content asset, a user can select or it can be determined which portions of the content asset to download at a particular quality (e.g., bit rate). For example, if a content asset is ten minutes in playback duration and the receiving device has a stable 500 kbps network connection, the receiving device can download the 300 kbps version (e.g., 10 minutes*60 seconds*300 kbps=180,000 kb total asset size) about six minutes (e.g., 180,000 kb total asset size/500 kbps=360 seconds). As another example, information such as an available time for download (e.g., eight minute window to download the content asset before network connectivity is not available) can be provided. Since the 300 kbps version of the ten minute content asset (e.g., 180,000 kb total asset size) can be completely received in six minutes, the receiving device can use the remaining two minutes of available time to download a portion of the content asset (e.g., 3.3 minutes of playback of the content asset) at the higher 600 kbps version. Any portion of the content asset can be downloaded at the higher quality bitrate. In a further example, the receiving device can download 1.1 minutes of the 1200 kbps version or any other combination of bitrates, anywhere in the content asset.

In an aspect, the data intelligence element 128 can be configured to determine one or more options for receiving MBR content assets. As an example, one or more of the following formulas can be used to determine one or more options for providing/receiving one or more content assets or portions thereof:

The minimum amount of data received in order to download an entire asset at a minimum bit rate (e.g., 300 kbps) can be calculated by:

10 minute asset*60 sec*300 kbps minimum MBR stream=180,000 kb asset

If it is determined that the entire asset needs to be downloaded in 8 minutes and the user has on average 500 kbps of bandwidth, the user can download a total of 240,000 kb, as shown below:

8 minutes of available download time*60 sec*500 kbps=240,000 kb available to download The 240,000 available less the 180,000 kb required provides=60,000 kb of extra bytes to which a different bitrate can be applied. It can then be determined which blocks should be improved by downloading them at a higher bit rate. Assuming a higher bitrate of 600 kbps is selected for the remaining 60,000 kb, a 300 kbps difference from the minimum 300 kbps feed is determined. If the device downloaded 300 kbps and 600 kbps blocks, 3.33 minutes of content can be downloaded at 600 kbps and 1.11 minutes at 1200 kbps, as shown below:

60,000 kb/300 kbps/60 s=3.333 minutes available of the 600 kbps feed that can be downloaded anywhere in the asset 60,000 kb/900 kbps(difference 1200–300)/60.5=1.11 minutes available of the 1200 kbps feed that can be downloaded anywhere in the asset.

As a another example, when a device has limited bandwidth, a lower bitrate can be selected to ensure the device receives as much of the data asset as possible in a given amount of time. As a further example, if bandwidth changes during download, the determination of bitrate selection can be modified based on the change in bandwidth.

Figure 2:
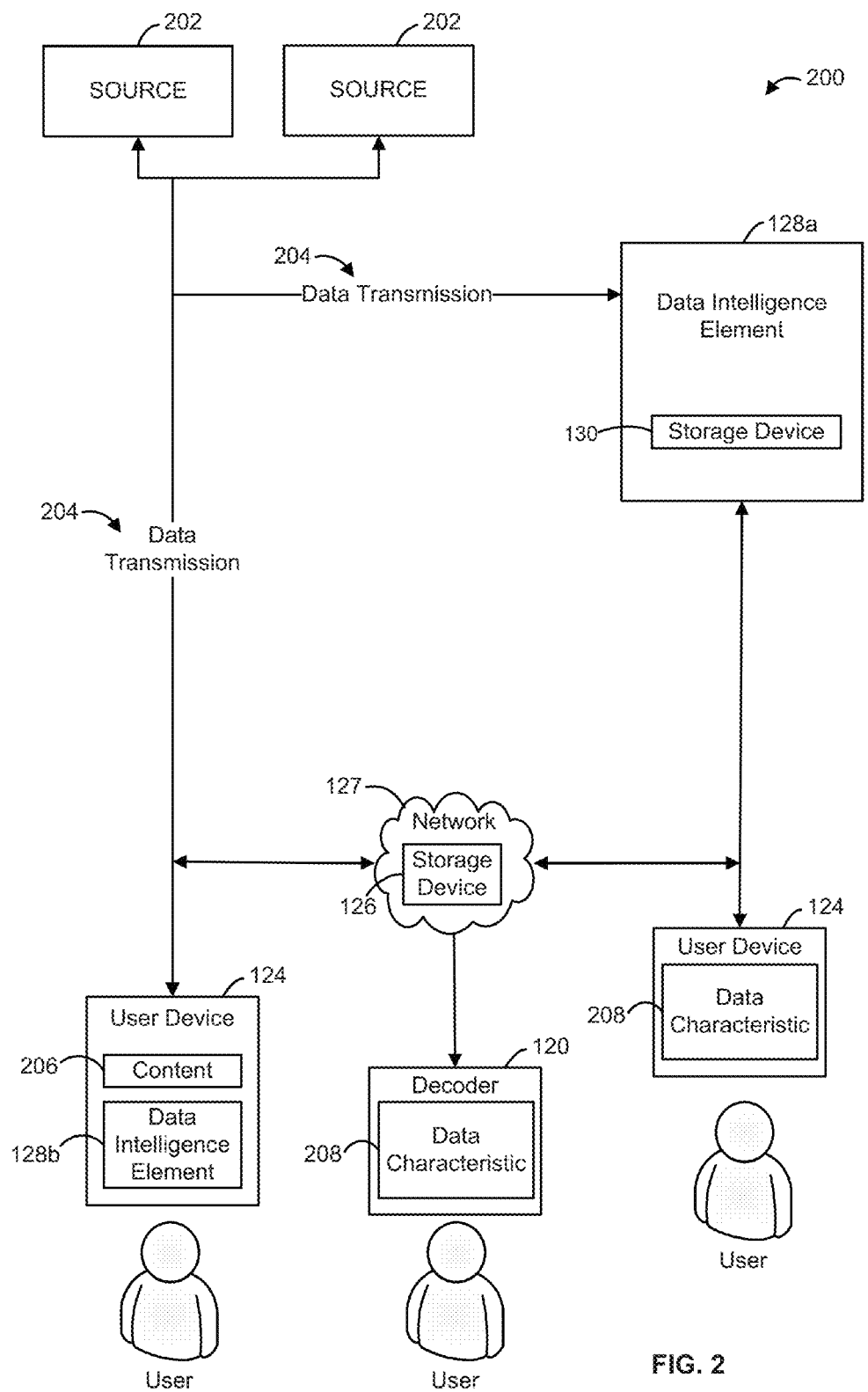
FIG. 2 is a block diagram of an exemplary system.

FIG. 2 is a block diagram of an exemplary content control system 200. The system 200 can comprise one or more data sources 202 for accessing, storing, and/or transmitting data, e.g., a transmission of file-based data. As an example, one or more of the sources 202 can be a large area (wide area), such as a national programming source, or a small area (local area) such as a local programming source local affiliate). In an aspect, one or more of the sources 202 can comprise content delivery networks (CDN). In another aspect, the data sources 202 can comprise a content provider (e.g., provider of audio content, video content, data services, news and programming, advertisements, alternate content, etc.) configured to transmit the data (e.g., as content assets via a stream, fragments, files, etc.) to various end-users. In an aspect, one or more data sources 202 can comprise a supplemental content database. In another aspect, the supplemental content database can comprise an advertisement or alternate content database (e.g., second screen content) having a plurality of advertisements stored therein or capable of accessing advertisements stored elsewhere. As an example, the advertisement database can comprise a plurality of video advertisements, which can be interactive or other types of advertisements. As a further example, the plurality of video advertisements can each have a particular time duration associated therewith. In an aspect, the time duration associated with the advertisements, alternate, and/or supplemental content can be varied in duration. As an example, a particular advertisement can have multiple versions, wherein each version of the same advertisement can have a different time duration. Accordingly, an advertisement having a particular time duration can be retrieved to fill a time slot having a substantially equal time duration. Any item of content is sources 202 can be retrieved or transmitted to the end user.

In an aspect, one or more sources 202 can process and/or transmit data 204 to one or more network devices such as user devices 124 and/or decoders 120. As another example, a storage medium facilitates storage of at least a portion of the data 204 such as by network storage device 126. Any portion of the data 204 can be stored locally to a receiving device (e.g., user device 124, decoder 120, etc.) or remotely from the receiving device. As a further example, the receiving device can process the data 204 to provide (e.g., present on a display) content 206 to a user. In an aspect, content 206 that is provided based on a processing rendering or otherwise presenting) of the data 204 can be substantially similar to content provided to other devices and users receiving and/or processing the same data 204 or copies thereof. As an example, a large area, e.g., national programming feed, can be transmitted to multiple local affiliates (e.g., servicing cities or metropolitan areas) for distribution to local devices. As a further example, the local affiliates can be equipped to control the transmission of data (e.g., data feed 204) to one or more devices associated with the local affiliate. As such, the local affiliate can provide content 206 based on one or more of the data feed 204, local programming, local advertisements, stored data, national programming, alternative programming, and the like.

In an aspect, one or more data intelligence elements 128a, 128b can be in communication with one or more of the sources 202, the decoder 120, and the user devices 124. As an example, data intelligence element 128h can be co-located and/or integrated with one or more of the sources 202, the decoder 120, and the user devices 124. One or more data intelligence elements 128a, 128b can be disposed in any location or part of any network architecture. In another aspect, the data intelligence element 128 can be configured to receive the data 204, such as incoming network programming or any data feed, via one or more sources 202. As an example, the data intelligence elements 128a, 128b can determine characteristic information 208 relating to one or more data assets (e.g., data 204) and/or the receipt and/or transmission of the data 204. Characteristic information 208 can comprise one or more of a signal-to-noise ratio, coding information such as scalable video coding, frame information such as frame type, motion information, video score, mean opinion score (MOS), and the like. As another example, a storage medium such as storage device 130 can facilitate storage (e.g., in a buffer or more permanent storage) of at least a portion of the data 204 and/or characteristic information 208.

In an aspect, the data intelligence elements 128a, 128b can be configured to determine a signal-to-noise ratio relating to one or more content assets or portions of content. As an example, a peak signal-to-noise ratio (PSNR) can be determined for one or more frames or blocks of encoded frames in one or more videos. As such, a device (e.g., user device 124) configured to receive the content can select a quality setting for the received content, wherein the quality setting defines a minimum PSNR setting to be applied throughout the entire video. Accordingly, for example, portions of the content (e.g., frames, data blocks, scenes) where there is fast motion or other hard to compress video, can be received (e.g., downloaded) having a high bitrate to maintain the minimum PSNR associated with the selected quality setting. Other portions of the video, such as easy to compress video, can be received having a lower bitrate, while maintaining the minimum PSNR. The relative difficulty of compressing video can be a function of the movement of images from frame to frame. For example, compressing of video having multiple I-frames of a group of picture (GOP) structure can be more difficult than video with a single I-frame. Examples of hard to compress content asset can comprise content including a camera panning an audience watching a sporting event, wherein many of the individuals in the audience are moving along with the camera causing each of them to move within the frame and new people to show up on the leading edge. An asset with many scene cuts can also be considered a hard to compress content due to the increased number of I-frames. Examples of easy to compress content asset can comprise a news anchor talking in front of a camera, wherein only the anchor's mouth and/or head is moving between frames with the occasional upper right/left graphic that stays on screen for a few seconds. Other examples of easy to compress content include credits, scrolling text, and mostly black/white/solid color images.

Bitrate and quality can depend on the codec used. There may be some MBR feeds available in mpeg4 or HEVC but a portion of clients may not be able to download such codecs. Accordingly, PSNR can provide a comparative mechanism between quality of the different feeds compressed with different codecs. In mpeg 2 a high bitrate feed for HD can be in the range of 12-18 mbps and a low bitrate feed can be in the range of 3-6 mbps. In mpeg4, a high bitrate feed for HD can be in the range of 6-8 mbps and a low bitrate feed can be in the range of 1-2 mbps. In HEVC, a high bitrate feed for HD can be in the range of 3-4 mbps and a low bitrate feed can be in the range of 0.5-1 mbps. Other relative ranges for high and low bitrates can be used.

In an aspect, the data intelligence elements 128a, 128b can be configured to determine coding information (e.g., scalable video coding (SVC)) relating to one or more content assets or portions of content. As an example, SVC or similar method can be implemented to facilitate the reception (e.g., download) of coding information having the delta between two different MBR streams. As a further example, a receiving device (e.g., user device 124) can initiate a download of the lowest available bitrate data so that the user can receive or access download) the entire content asset as quickly as possible. The receiving device can then receive or access SVC delta information for portions of the received content asset to improve upon the initial version or portions of the initial version of the content asset. As an example, the SVC delta information relating to portions of the content with the lowest PSNR can be received first. Other coding information can be received and applied to any portion of the content asset to improve the bitrate of that portion.

In an aspect, the data intelligence elements 128a, 128b can be configured to facilitate selection of one or more versions (e.g., bit rates) of a content asset. In another aspect, a user can manually select the preferred bit rate of a content asset. In a further aspect, a user can provide information such as an available time to allow download and the data intelligence elements 128a, 128b can determine the best bit rate or rates that will allow the entire content asset to be downloaded. As an example, it could be determined that some of the content be download at each of the 300 kbps, 600 kbps, and 1200 kbps streams, and the high complexity blocks be given more bitrate to maintain a threshold PSNR. In another aspect, when downloading or otherwise transferring (e.g., streaming) data, time can be allotted per block or per scene based on PSNR. As an example, more time can be allotted for high PSNR data blocks and less time can be allotted for low PSNR data blocks.

Figure 3:
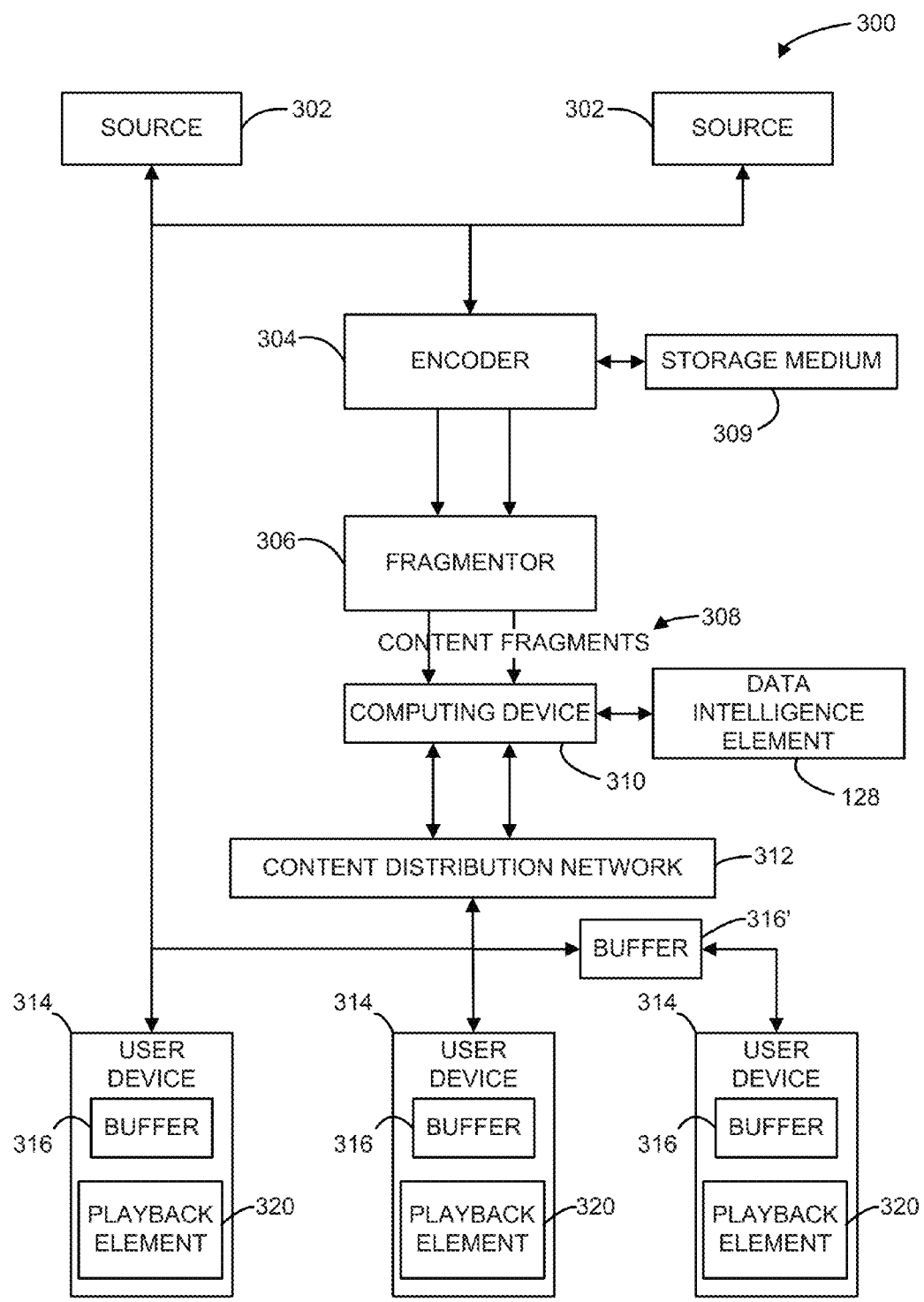
FIG. 3 is a block diagram of an exemplary system.

FIG. 3 is a block diagram of an example system 300. The system 300 can comprise one or more data sources 302 for accessing and/or transmitting data, such as a data stream. An encoder 304 can be in signal communication with the data source 302. A fragmentor 306 can be in signal communication with the encoder 304. As an example, the encoder 304 and the fragmentor 306 can be integrated as part of a unitary device. However, the encoder 304 and the fragmentor 306 can be separate and distinct components.

In an aspect, the data sources 302 can comprise one or more content providers for providing one or more of audio content, video content, data, news feeds, sports programming, social media services, advertisements, and the like. As an example, the data sources 302 can be configured to transmit the data (e.g., as a stream, fragments, files, etc.) to various end-users. In an aspect, one or more data sources 302 can comprise a content database having a plurality of advertisements, supplemental content, alternate content, or the like stored therein or capable of accessing content stored elsewhere. As an example, the content database can comprise a plurality of video advertisements. As a further example, the plurality of advertisements, supplemental content, and/or alternate content can each have a particular time duration and/or bitrate associated therewith. In an aspect, the time duration and/or bitrate associated with the advertisements, supplemental content, and/or alternate content can be varied in duration for application in various time dependent circumstances.

As an example, one or more of the data sources 302 can comprise a network data feed transmitting the data stream to users such as subscribers or clients. As a further example, the one or more data sources 302 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 304 can be configured to receive the data stream from any source having any format that can be encoded (or transcoded) into a format that is appropriate for streaming or otherwise transmitting.

The encoder 304 can be any device, system, apparatus, or the like to encode and/or transcode the data stream. In an aspect, the encoder 304 converts a single (high) bit rate to an output of multiple (lower) bitrates and resolutions. As an example, the encoder 304 can convert the data stream from the input format received from the data source (such as MPEG-2, QAM, etc.) to a transport format for distribution to consumers (such as MPEG-4). In an aspect, the encoder 304 can be a device such as a transcoder that conditions streaming data and/or changes it from one format to another. The encoder 304 can be configured to receive the data stream, or other type of signal, from one or more of the data sources 302 and encode/transcode information onto the data stream. In an exemplary embodiment, the encoder 304 can be configured to add information to the data stream relating to content fragments 308 or data blocks. In an aspect, a buffer or storage medium 309 can be in communication with the encoder 304 or integrated therewith. As an example, data received by the encoder 304 can be buffered or stored in the storage medium 309.

In an aspect, the fragmentor 306 can be in signal communication with the encoder 304 to receive the data stream therefrom. As an example, the fragmentor 306 and the encoder 304 are configured as a unitary device. However, the fragmentor 306 and the encoder 304 can be integrated or separate. In an aspect, fragmentor 306 conditions the data stream (or other data signal) for downstream distribution by a computing device 310 through a content distribution network 312 to user devices 314 (e.g. the decoder 120). In an aspect, the computing device 310 can be an origin Hypertext Transfer Protocol (HTTP) computing device. However, other computing devices can be used, such as a rate adaptive streaming server. As an example, the fragmentor 306 can communicate with the computing device 310 using the POST method of the HTTP. As a further example, the computing device 310 can implement the functions described relative to the encoder 304 and/or the fragmentor. However, other protocols, configurations, and communication methods can be used.

In an example embodiment, the fragmentor 306 separates or fragments the data stream into each of the content fragments 308 represented by the data stream based upon information encoded in the data stream by the encoder 304. In an additional example embodiment, the fragmentor 306 accesses the information encoded/inserted in the data stream by the encoder 304 to define the content fragments 308 based on, among other things, boundaries, grouping, timing, or duration. Once the content fragments 308 are generated, the content fragments 308 can be transmitted to the content distribution network (CDN) 312 for delivery to the user devices 314 for consumption (e.g., playback). As an example, the computing device 310, CDN 312, and the user devices 314 can intercommunicate using the GET method of HTTP. However, other protocols and communication methods can be used.

In an aspect, one or more of the user devices 314 can comprise a buffer 316. As an example, the buffer 316 can comprise a memory or a storage device. As a further example, a number of the content fragments 308 can be loaded into the buffer 316 and stored for playback by the associated user device 314. Accordingly, the user device 314 can retrieve the content fragments 308 from the buffer 316 for playback without having to communicate with the CDN 312, thereby reducing the data stream, which can comprise audio, video, or other data from the computing device 310 with a regular cadence every two seconds, four seconds, ten seconds). Other data, content, and/or information can be stored in the buffer 316 such as advertisements and alternative content, for example.

In an aspect, a buffer 316' can be separate from the user device 314. For example, the buffer 316' can be located upstream of the user device 314 and downstream of the CDN 312. As a further example, the buffer 316' can store information to be transmitted to any number of user devices 314 or other recipient devices. Accordingly, the user device 314 can retrieve the content fragments 308 from the buffer 316' for playback without having to communicate with the CDN 312, thereby reducing latency in playback. In an aspect, the content fragments 308 can be retrieved from buffer 316 and 316' simultaneously or in various sequences.

In an aspect, a data intelligence element 128 can be in communication with one or more of the user devices 314. In an aspect, the data intelligence element 128 can be in communication with one or more data sources 302, an origin server, computing device 310, and/or the content distribution network 312. As an example, the data intelligence element 128 can be configured to control presentation of data, such as content, to one or more of the user devices 314.

In an aspect, the data intelligence element 128 can be configured to determine a signal-to-noise ratio relating to one or more content assets or portions of content. As an example, a peak signal-to-noise ratio (PSNR) can be determined for one or more frames or blocks (e.g., segments or fragments of content) of encoded frames in one or more videos. As such, a device (e.g., user device 124) configured to receive the content can select a quality setting (e.g., minimum quality and/or maximum quality) for the received content, wherein the quality setting includes a definition of a minimum and/or maximum PSNR setting to be applied throughout (e.g., or block-by-block) the entire video. Accordingly, for example, portions of the content (e.g., frames, data blocks, scenes) where there is fast motion or other high bandwidth or hard to compress video, the receiving device can receive (e.g., stream or download) data having a higher bitrate to maintain the minimum PSNR associated with the selected quality setting. Other portions of the video, such as easy to compress video, can be received having a lower bitrate, while maintaining the minimum PSNR.

In an aspect, the data intelligence element 128 can be configured to determine coding information (e.g., scalable video coding (SVC)) relating to one or more content assets or portions of content assets. As an example, SVC or similar method can be implemented to facilitate the reception (e.g., download) of coding information having the delta between two different MBR streams. As a further example, a receiving device (e.g., user device 124) can initiate streaming or a download of the lowest available bitrate data so that the user can receive or access (e.g., stream or download) the entire content asset as quickly as possible. The receiving device can then receive or access SVC delta information for the received content asset to improve upon the initial version of the content asset. As an example, the SVC delta information relating to portions of the content with the lowest PSNR can be received first. Other coding information can be received and applied to any portion of the content asset to improve the bitrate of the portion.

In an aspect, the data intelligence element 128 can be configured to facilitate selection of one or more versions (e.g., bit rates) of a content asset. In another aspect, a user can manually select the preferred bit rate of a content asset. In a further aspect, a user can provide information such as an available time to allow download and the data intelligence element 128 can determine the best bit rate that will allow the entire content asset to be downloaded.

In an aspect, when a receiving device is downloading a MBR content asset versus streaming the content asset, the receiving device does not need to maintain a specific throughput to view a specific quality (e.g., bit rate) of the content asset. For example, if a receiving device has a network connection that is consistently 500 kbps, and the available MBR streams are 300 kbps, 600 kbps, 1200 kbps and 3000 kbps, the receiving device can only ever stream the lowest 300 kbps stream (with occasional 600 kbps blocks) unless the receiving device buffers for an extended period of time. However, when downloading the content asset, a user can select which portions of the content asset to download at a particular quality (e.g., bit rate), For example, if a content asset is ten minutes in playback duration and the receiving device has a stable 500 kbps network connection, the receiving device can download the 300 kbps version in about six minutes. As another example, information such as an available time for download (e.g., eight minute window to download the content asset before network connectivity is not available) can be provided. Since the 300 kbps version of the ten minute content asset (e.g., 180,000 kb) can be completely received in six minutes, the receiving device can use the remaining two minutes of available time to download a portion of the content asset (e.g., 3.3 minutes of playback of the content asset) at the higher 600 kbps version. Any portion of the content asset can be downloaded at the higher quality bitrate. In a further example, the receiving device can download 1.1 minutes of the 1200 kbps version or any other combination of bitrates, anywhere in the content asset.

Figure 4:
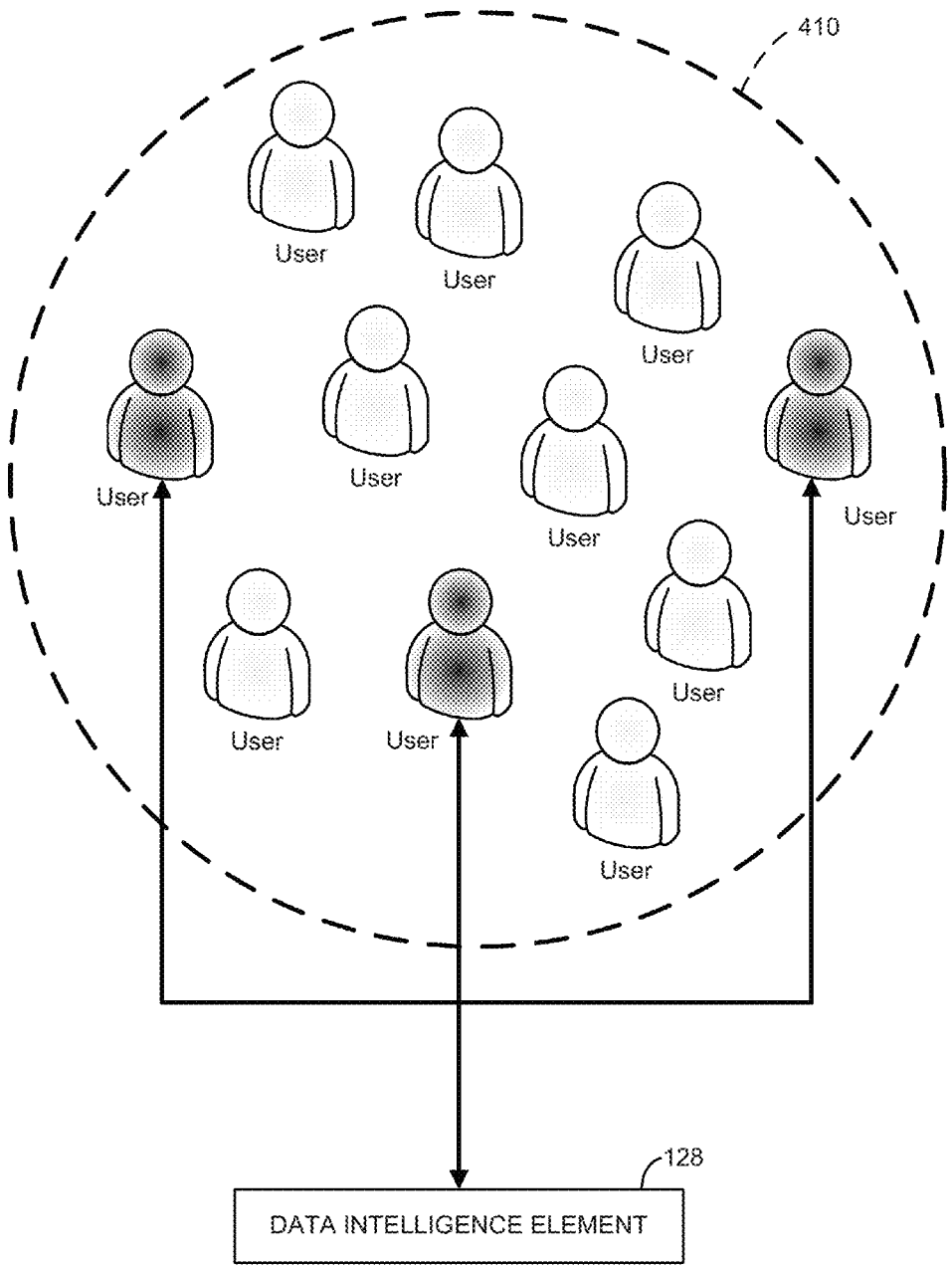
FIG. 4 is a representation of an exemplary network.
Figure 5:
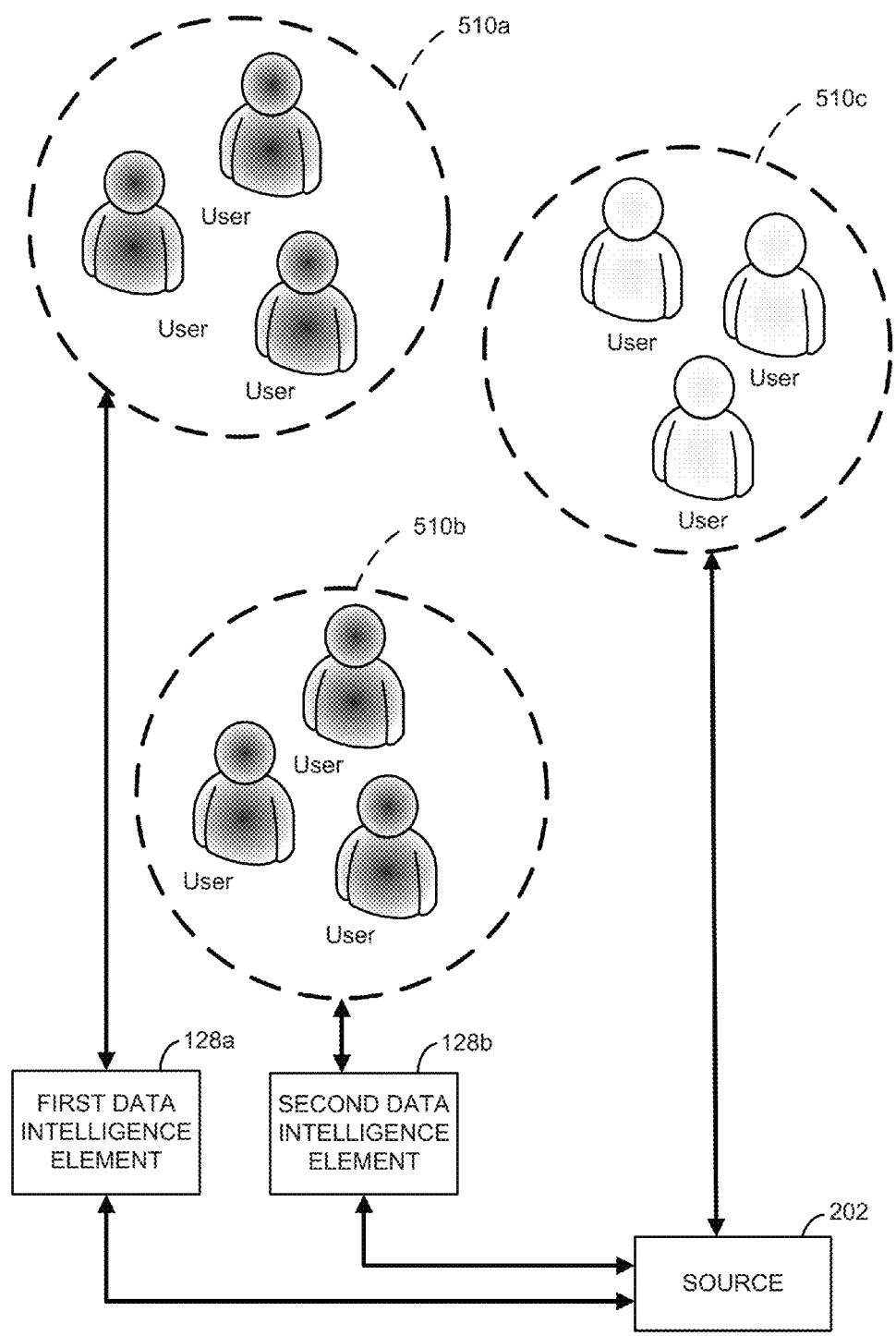
FIG. 5 is a representation of an exemplary network.

As shown in FIG. 4, a data intelligence element 128 can be configured to facilitate selection of one or more versions (e.g., bit rates) of a content asset for transmission to one or more (as shown), or all of the devices or users that have the same location identifier or classifier 410 such as a time zone, address, market, region, or the like. In an aspect, a device in communication with a local area network can be associated with a first identifier such as an Internet Protocol address, MAC address, location identifier, user identifier, time zone, market, region, class of service, or the like. One or more versions (e.g., bit rates) of a content asset can be selected and transmitted to the device based on the first identifier. In a further aspect, the same device can connect to another network external to the local area network, wherein the device can be associated with a second identifier (e.g., Internet Protocol address, MAC address, location identifier, user identifier, time zone, market, region, class of service, etc.) different from the first identifier. As shown in FIG. 5, one or more of a first data intelligence element 128a and a second data intelligence element 128b can be configured to selectively provide one or more versions (e.g., bit rates) of a content asset for transmission to one or more devices or groups of users (as shown). As an example, one or more devices or users can be associated with one or more identifier 510a, 510b, 510c such as a time zone, market, region, class of service, location, service identifier, or the like.

Figure 6:
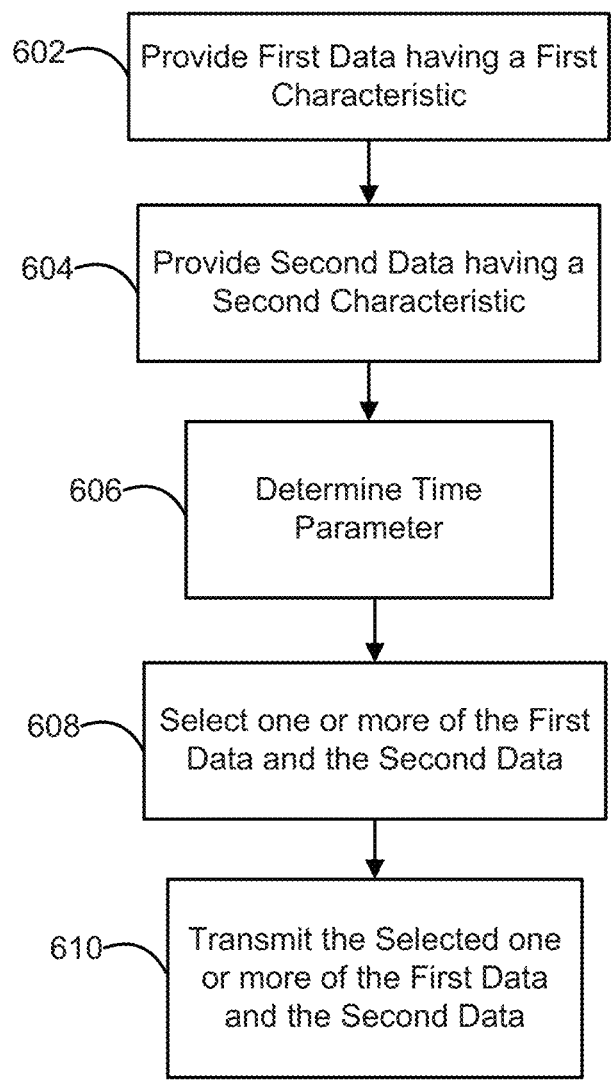
FIG. 6 is a flow chart of an exemplary method.

FIG. 6 illustrates an exemplary method for data delivery. In step 602, first data can be provided having a first characteristic. In an aspect, the first data can relate to a content asset. The first data can comprise content fragments of the content asset. The first characteristic can comprise one or more of a bit rate, a resolution, signal-to-noise ratio, playback time, compression, data size, etc.

In step 604, second data can be provided having a second characteristic. In an aspect, the second data can relate to a content asset. As an example, the second data can relate to the same content asset as the first data. As a further example, the first data and the second data can be or comprise different versions of the same content asset. The second data can comprise content fragments of the content asset. The second characteristic can comprise a bit rate, a resolution, or a combination thereof.

In step 606, a time parameter can be determined. In an aspect, the time parameter can relate to the transmission and/or receipt of data such as content. In another aspect, the time parameter can comprise a total time available to transfer. In a further aspect, determining a time parameter can comprise receiving a selected time parameter from a user device.

In step 608, one or more of the first data and the second data can be selected. In an aspect, the one or more of the first data and the second data can be selected based on the determined time parameter. In another aspect, selecting one or more of the first data and the second data can comprise selecting one or more of the first data and the second data that can be completely transferred within the time parameter. Each or both of the first data and the second data can be selected.

In step 610, the selected one or more of the first data and the second data can be transmitted, for example, to a user device or another network device. In an aspect, the selected one or more of the first data and the second data can be transmitted within the time parameter. In another aspect, scalable video coding delta information can be transmitted. As an example, the scalable video coding delta information can relate to content, for example, the same content relating to the one or more of the first data and the second data. In another aspect, the scalable video coding delta information can be transmitted within the time parameter.

Figure 7:
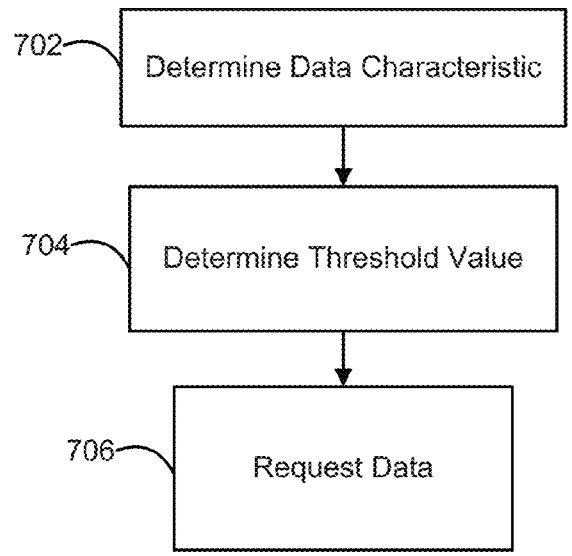
FIG. 7 is a flow chart of an exemplary method.

FIG. 7 illustrates an exemplary method for data delivery. In step 702, a data characteristic such as signal-to-noise ratio information (e.g., peak signal-to-noise ratio information) can be determined. Determining signal-to-noise ratio information can comprise accessing or receiving peak signal-to-noise ratio information associated with a data asset. In an aspect, the signal-to-noise ratio information can relate to one or more data blocks such as portions (e.g., segments or fragments) of a content asset, for example. In another aspect, each of the one or more of the data blocks can have a bit rate associated therewith, such that versions of the same data block can each have a different bit rate.

In step 704, a threshold signal-to-noise ratio can be determined. Determining a threshold (e.g., minimum and/or maximum) signal-to-noise ratio can comprise receiving a selection of a threshold signal-to-noise ratio from a user device or another network element. In an aspect, the threshold signal-to-noise ratio can comprise a peak signal-to-noise ratio.

In step 706, one or more of the data blocks can be requested based upon respective signal-to-noise ratio information and the threshold signal-to-noise ratio. In an aspect, requesting one or more of the data blocks can comprise requesting one or more data blocks having a bit rate that maintains a signal-to-noise ratio information within the threshold signal-to-noise ratio.

Figure 8:
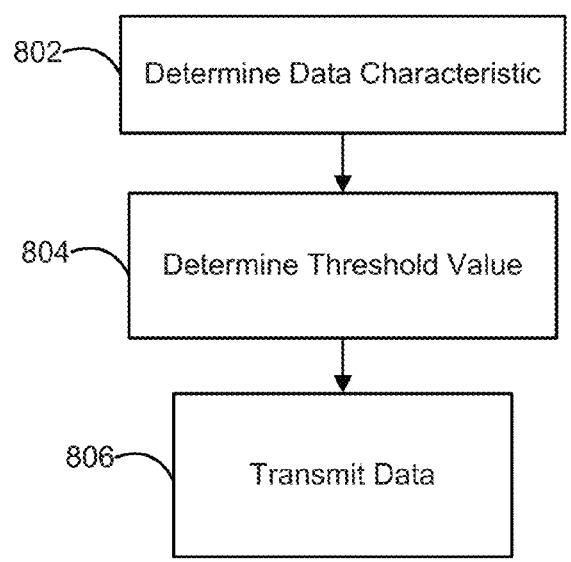
FIG. 8 is a flow chart of an exemplary method.

FIG. 8 illustrates an exemplary method for data delivery. In step 802, a data characteristic such as signal-to-noise ratio information (e.g., peak signal-to-noise ratio information) can be determined. Determining signal-to-noise ratio information can comprise accessing or receiving peak signal-to-noise ratio information. In an aspect, the signal-to-noise ratio information can relate to one or more data blocks such as portions (e.g., fragments) of a content asset, for example. In another aspect, each of the one or more of the data blocks can have an associated bit rate.

In step 804 a threshold signal-to-noise ratio can be determined. Determining a threshold signal-to-noise ratio can comprise receiving a selection of a threshold signal-to-noise ratio. In an aspect, the threshold signal-to-noise ratio can comprise a peak signal-to-noise ratio.

In step 806, one or more of the data blocks can be transmitted based upon respective signal-to-noise ratio information and the threshold signal-to-noise ratio. In an aspect, requesting one or more of the data blocks can comprise requesting one or more data blocks having a bit rate that maintains a signal-to-noise ratio information within the threshold signal-to-noise ratio.

In an aspect, the methods and systems disclosed can utilize one or more computers to perform one or more functions in one or more locations. In an exemplary aspect, the methods and systems can be implemented on a computing system 901 as illustrated in FIG. 9 and described below.

Figure 9:
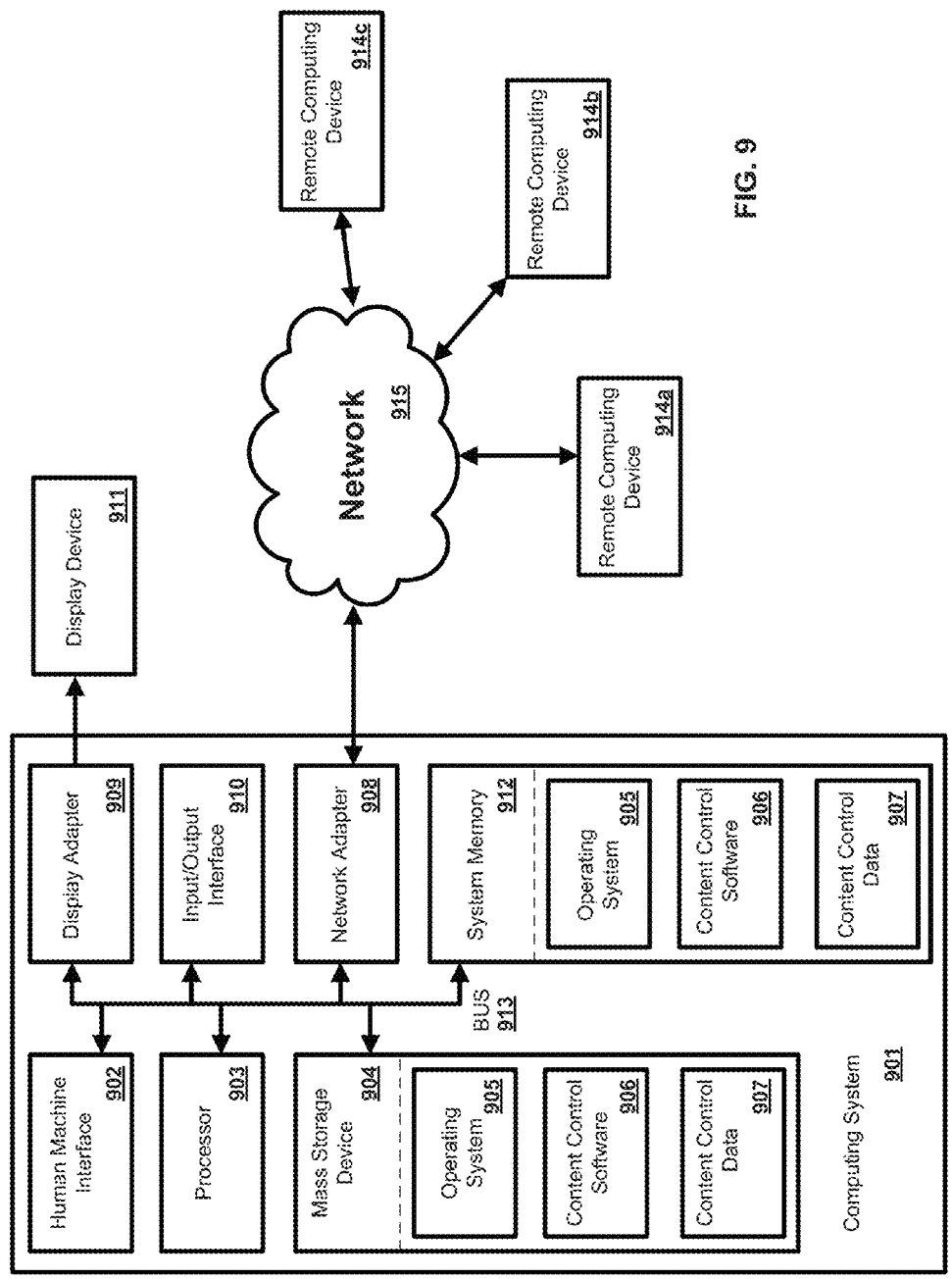
FIG. 9 is a block diagram of an exemplary computing system.

FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 901. The components of the computing system 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, content control software 906, content control data 907, a network adapter 908, system memory 912, an Input/Output Interface 910, a display adapter 909, a display device 911, and a human machine interface 902, can be contained within one or more remote computing devices 914*a,b,c* at physically separate locations, connected through buses of this form, in effect implementing a fully distributed system.

The computing system 901 typically comprises a variety of computer readable media. Exemplary readable media can be any available media that is accessible by the computing system 901 and comprises, for example and not meant to be limiting, bath volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as content control data 907 and/or program modules such as operating system 905 and content control software 906 that are immediately accessible to and/or are presently operated on by the processing unit 903.

In another aspect, the computing system 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computing system 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and content control software 906. Each of the operating system 905 and content control software 906 (or some combination thereof) can comprise elements of the programming and the content control software 906. Content control data 907 can also be stored on the mass storage device 904. Content control data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 907 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computing system 901 can have more than one display adapter 909 and the computing system 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computing system 901 via Input/Output Interface 910. Any step and/or result of the methods can be output in any form to an output device. Such output can be any form of visual representation, including, but not limited to, textual, graphical, animation, audio, tactile, and the like. The display 911 and computing system 901 can be part of one device, or separate devices.

The computing system 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computing system 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing system 901, and are executed by the data processor(s) of the computer. An implementation of content control software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   identifying a time window for transmitting content;
   determining peak signal-to-noise ratio information relating to one or more data blocks;
   associating a time parameter with each of the one or more data blocks based upon the time window and the respective peak signal-to-noise ratio information;
   selecting a version of each of the one or more data blocks based upon the respective time parameter, wherein the version of the one or more data blocks is selected at least in part based on a particular bit rate for presenting the version of the one or more data blocks; and
   transmitting the selected version of the one or more data blocks.

2. The method of claim 1, wherein the time window relates to a total time available to transfer the one or more data blocks.

3. The method of claim 1, wherein the time parameter represents an estimated time to transfer the respective data block.

4. The method of claim 1, wherein the selecting the version of each of the one or more data blocks comprises selecting a version of each of the one or more data blocks with an appropriate bitrate for the respective time parameter.

5. The method of claim 1, wherein the selecting the version of each of the one or more data blocks comprises selecting a version of each of the one or more data blocks with an appropriate resolution for the respective time parameter.

6. The method of claim 1, further comprising:
   determining that time remains in the time window;
   selecting at least one of the transmitted selected versions of the one or more data blocks to replace;
   selecting a new version of the selected at least one of the transmitted selected versions of the one or more data blocks; and
   transmitting the new version of the selected at least one of the transmitted selected versions of the one or more data blocks.

7. The method of claim 6, wherein the selecting the at least one of the one or more data blocks to replace comprises selecting the at least one of the one or more data blocks based on the respective peak signal-to-noise ratio information.

8. The method of claim 6, wherein the selecting the at least one of the one or more data blocks to replace comprises selecting the at least one of the one or more data blocks based on the respective version.

9. A system comprising:
a memory; and
a processor configured for,
identifying a time window for transmitting content,
determining peak signal-to-noise ratio information relating to one or more data blocks,
associating a time parameter with each of the one or more data blocks based upon the time window and the respective peak signal-to-noise ratio information,
selecting a version of each of the one or more data blocks based upon the respective time parameter, wherein the version of the one or more data blocks is selected at least in part based on a particular bit rate for presenting the version of the one or more data blocks, and
transmitting the selected version of the one or more data blocks.

10. The system of claim 9, wherein the time window relates to a total time available to transfer the one or more data blocks.

11. The system of claim 9, wherein the time parameter represents an estimated time to transfer the respective data block.

12. The system of claim 9, wherein the selecting the version of each of the one or more data blocks comprises selecting a version of each of the one or more data blocks with an appropriate bitrate for the respective time parameter.

13. The system of claim 9, wherein the selecting the version of each of the one or more data blocks comprises selecting a version of each of the one or more data blocks with an appropriate resolution for the respective time parameter.

14. The system of claim 9, wherein the processor is further configured for,
determining that time remains in the time window;
selecting at least one of the transmitted selected versions of the one or more data blocks to replace;
selecting a new version of the selected at least one of the transmitted selected versions of the one or more data blocks; and
transmitting the new version of the selected at least one of the transmitted selected versions of the one or more data blocks.

15. The system of claim 14, wherein the selecting the at least one of the one or more data blocks to replace comprises selecting the at least one of the one or more data blocks based on the respective peak signal-to-noise ratio information.

16. The system of claim 14, wherein the selecting the at least one of the one or more data blocks to replace comprises selecting the at least one of the one or more data blocks based on the respective version.

17. A method comprising:
receiving a request for one or more data blocks;
determining a time parameter comprising a time window relating to a total time available to transmit the one or more data blocks;
determining peak signal-to-noise ratio information relating to the one or more data blocks;
associating the time parameter with each of the one or more data blocks based upon the respective signal-to-noise information;
selecting a version of each of the one or more data blocks based upon the respective time parameter and the respective peak signal-to-noise ratio information, wherein the version of the one or more data blocks is selected at least in part based on a particular bit rate for presenting the version of the one or more data blocks; and
transmitting the selected version of the one or more data blocks.

18. The method of claim 17, wherein the time window relates to a total time available to receive the one or more data blocks.

19. The method of claim 17, further comprising:
determining that time remains in the time window;
selecting at least one of the transmitted one or more data blocks to replace;
selecting a version of the selected at least one of the transmitted one or more data blocks; and
transmitting the new version of the selected at least one of the transmitted one or more data blocks.

20. The method of claim 19, wherein the new version of the selected at least one of the transmitted one or more data blocks is at a higher bit rate than the replaced version.

* * * * *